US010778411B1

(12) United States Patent
Marquardt et al.

(10) Patent No.: US 10,778,411 B1
(45) Date of Patent: Sep. 15, 2020

(54) SYSTEM FOR INTEREXCHANGE OF STATE DATA AMONG DISPARATE BLOCK CHAINS

(71) Applicant: Sprint Communications Company L.P., Overland Park, KS (US)

(72) Inventors: Ronald R. Marquardt, Woodinville, WA (US); Lyle W. Paczkowski, Mission Hills, KS (US); Ivo Rook, New York, NY (US)

(73) Assignee: Sprint Communications Compnay L.P., Overland Park, KS (US)

( * ) Notice: Subject to any disclaimer, the term of this patent is extended or adjusted under 35 U.S.C. 154(b) by 109 days.

(21) Appl. No.: 16/207,014

(22) Filed: Nov. 30, 2018

(51) Int. Cl.
  *H04L 29/06* (2006.01)
  *H04L 9/06* (2006.01)

(52) U.S. Cl.
  CPC .................................. *H04L 9/0618* (2013.01)

(58) Field of Classification Search
  CPC ..... H04L 63/08; H04L 9/0618; H04L 9/3265; H04L 67/141; H04W 12/06; G06F 21/32; G06F 19/00; G16H 40/67; A61B 5/0022
  See application file for complete search history.

(56) References Cited

U.S. PATENT DOCUMENTS

| 9,282,898 | B2 | 3/2016 | McRoberts et al. | |
| 2013/0345530 | A1* | 12/2013 | McRoberts | H04L 63/08 600/323 |
| 2018/0349621 | A1* | 12/2018 | Schvey | G09C 1/00 |
| 2019/0149429 | A1* | 5/2019 | Stocker | H04L 12/4625 709/225 |
| 2019/0333054 | A1* | 10/2019 | Cona | H04W 12/00518 |
| 2020/0057865 | A1* | 2/2020 | Yan | G06F 21/6218 |
| 2020/0136805 | A1* | 4/2020 | Clawson | H04L 9/0643 |

* cited by examiner

*Primary Examiner* — Amir Mehrmanesh (57) ABSTRACT

A method of using an interexchange to process states of subsystems tracked by disparate block chains. The method comprises locating a first block comprising current state information associated with a first process stored in a first block chain by an interexchange application executing on a computer system, wherein the first process is performed by a first subsystem, reading the current state information of the first process by the interexchange application from the located first block, transcoding a representation of the current state information by the interexchange application to a representation associated with a second block chain, creating a block by the interexchange application, wherein the created block stores the transcoded representation of the current state information in a data field of the created block that the predefined block structure associates to the transcoded current state information, and attaching the created block to the second block chain.

7 Claims, 7 Drawing Sheets

SYSTEM FOR INTEREXCHANGE OF STATE DATA AMONG DISPARATE BLOCK CHAINS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Block chain data management techniques may be used to store data generated by subsystems. Each block added to the block chain can record data or current state information associated with the subsystem. A single block may comprise a plurality of different state data items, for example current values of each of the different parameters of the subsystem that are deemed desirable to sense and record. The state information of a plurality of separate subsystems may be used collectively to determine a comprehensive view of the system that comprises the plurality of separate subsystems.

SUMMARY

In an embodiment, a method of using an interexchange to process states of subsystems tracked by disparate block chains is disclosed. The method comprises locating a first block comprising current state information associated with a first process stored in a first block chain by an interexchange application executing on a computer system, wherein the first process is performed by a first subsystem and the first block chain comprises a first format and reading the current state information of the first process by the interexchange application from the located first block. The method comprises locating a second block comprising current state information associated with a second process stored in a second block chain by the interexchange application, wherein the second process is performed by a second subsystem and the second block chain comprises a second format that is different from the first format and reading the current state information of the second process by the interexchange application from the located second block. The method comprises transcoding a representation of the current state information read from the located first block by the interexchange application to an interexchange representation and transcoding a representation of the current state information read from the located second block by the interexchange application to the interexchange representation. The method comprises locating a state evaluation rule by the interexchange application in a data store based on an identity of the first subsystem and based on an identity of the second subsystem, executing the state evaluation rule by the interexchange application, wherein the interexchange application provides the transcoded representation of the current state information from the located first block and the transcoded representation of the state information from the located second block as input to the state evaluation rule, generating a block by the interexchange application, where the block comprises a data portion recording a result of executing the state evaluation rule, and storing the block generated by the interexchange application on an interexchange block chain.

In another embodiment, a method of using an interexchange to process states of subsystems tracked by disparate block chains is disclosed. The method comprises locating a first block comprising current state information associated with a first process stored in a first block chain by an interexchange application executing on a computer system, wherein the first process is performed by a first subsystem and the first block chain comprises a first format and reading the current state information of the first process by the interexchange application from the located first block. The method comprises locating a second block comprising current state information associated with a second process stored in a second block chain by the interexchange application, wherein the second process is performed by a second subsystem and the second block chain comprises a second format that is different from the first format and reading the current state information of the second process by the interexchange application from the located second block. The method comprises transcoding a representation of the current state information read from the located first block by the interexchange application to an interexchange representation, transcoding a representation of the current state information read from the located second block by the interexchange application to the interexchange representation, analyzing the transcoded representation of the current state information from the located first block and the transcoded representation of the state information from the located second block, and controlling a system comprising the first subsystem and the second subsystem based on the analysis.

In yet another embodiment, a method of using an interexchange to process states of subsystems tracked by disparate block chains is disclosed. The method comprises locating a first block comprising current state information associated with a first process stored in a first block chain by an interexchange application executing on a computer system, wherein the first process is performed by a first subsystem and the first block chain comprises a first format, reading the current state information of the first process by the interexchange application from the located first block, and transcoding a representation of the current state information read from the located first block by the interexchange application to a representation associated with a second block chain. The method comprises creating a block by the interexchange application, wherein the created block is formatted in accordance with a predefined block structure of the second block chain and the created block stores the transcoded representation of the current state information from the located first block in a data field of the created block that the predefined block structure associates to the transcoded current state information from the located first block and attaching the created block to the second block chain.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless communication is spreading now to small electronic devices. The communications connectivity among these devices may be referred to as the "Internet of things" or IoT. These IoT devices may be very disparate in their behaviors and functionality. They may comprise electronic devices and/or processors embedded in consumer appliances such as refrigerators, microwave ovens, coffee pots, and dishwashers. They may comprise electronic devices and/or processors embedded in heating ventilation and air conditioning (HVAC) systems in commercial buildings and retail stores. They may comprise electronic devices and/or processors embedded in consumer entertainment electronics such as televisions, sound bars, digital video recorders (DVRs), video gaming systems. They may comprise electronic subsystems in motor vehicles. In some cases, electronic devices that may not be considered IoT devices may exploit some of the communication and/or processing technologies developed for use by IoT devices and hence, in this limited context, may be treated as if they are IoT devices.

In an embodiment, electronic devices collect data about their environment that they store in a block chain or other distributed ledger storage. In an embodiment, the block chain may be stored locally on the electronic device. Alternatively, the block chain may be stored in one or more storage locations external to the electronic device. The block chain may be extended by adding new blocks that contain new data about their environment. The new data may be stored periodically or aperiodically, for example as new data becomes available or as new data is obtained which is different from previously collected data (e.g., to save storage space, only data which differs by a predefined amount from previous data may be stored).

The data may be parameters of an operating environment, such as temperature of an internal combustion engine, temperature of a vehicle transmission, fuel flow rate of an internal combustion engine, electric current in an electric motor, RPM of a fluid pump, pressure in an expansion coil and in a compressor of a refrigeration unit, and concentration of a gas. Because of the diversity of electronic devices that may communicate to a network (e.g., to an "Internet of things"), this data may be stored in a great variety of different formats. A first sensor may provide data that represents a parameter in English units (pounds, feet, gallons) and a second sensor may provide data that represents a parameter in SI units (grams, meters, liters). A third sensor may provide data in a raw form, such as in volts or amps. To make this panoply of data from disparate electronic devices useful, the data desirably is converted and adapted to be comparable.

The present disclosure teaches an interexchange application that is configured to promote interexchange and use of data from disparate sources. While this interexchange functionality does comprise adapting data formats to be intercomparable, the interexchange functionality extends further than this. The interexchange application may further encapsulate the knowledge of where an item of data is stored in a block chain associated with an electronic device and/or how to access the data stored in the block chain associated with an electronic device. For example, some data stored on block chains may be encrypted, and making use of the data may inherently involve locating the appropriate key with which to decrypt the data. In some contexts, the interexchange application may be referred to as an interexchange framework, suggesting its extensibility and flexibility for being adapted to handle new and different interexchange operations associated with different electronic devices and/or different block chain formats.

In an embodiment, an interexchange application may read a first data item from a first block chain associated with an electronic device, read a second data item from a second block chain associated with a different electronic device, perform analysis on the first and second data items, and adapt a process based on the analysis. For example, the first data item may be an operation parameter of an internal combustion engine, and the second data item may be an operation parameter of a transmission mechanically coupled to the engine and to one or more drive wheels of a vehicle. The engine may be referred to as a first subsystem of the vehicle and the transmission may be referred to as a second subsystem of the vehicle. The interexchange application may adapt a control command to a third subsystem of the vehicle, for example to a regenerative braking subsystem of the vehicle (e.g., electric generators/motors that recover electrical energy from the kinetic energy of a moving vehicle when braking the vehicle).

The interexchange application may execute a first transcoding subroutine or script to transcode the first data item to a predefined interexchange format and execute a second transcoding subroutine or script to transcode the second data item to the predefined interexchange format. The original equipment manufacturer (OEM) of the electronic unit monitoring the engine may create and distribute the first transcoding subroutine. The OEM of the electronic unit monitoring the transmission may create and distribute the second transcoding subroutine. The transcoding subroutines may include procedures to convert raw transducer values (e.g., values representing volts or amps) to standard units such as English units or SI units associated with the subsystem. For example, 1.47 millivolts output by a sensor and stored in a data item in a block chain may be transcoded to a temperature of 209 degrees Fahrenheit. For example, 23.9 milliamps output by a sensor and stored in a data item in another block chain may be transcoded to a pressure of 100 kilopascals.

The OEM of the third subsystem (e.g., electric generators/motors) may create and distribute a third transcoding subroutine to map control commands from a predefined interexchange format to a command format desired for use by the third subsystem. Additionally, the OEM of the third subsystem may define an analysis subroutine which the interexchange application executes to determine the control commands based on the first data item and on the second data item. The OEMs may further provide block schemas that define where data items are stored in data portions of blocks in a block chain associated with their subsystem. By OEMs of subsystems providing transcoding subroutines, block schemas, and analysis subroutines, the interexchange application may be extended to communicate with and to control different subsystems. Evaluation routines may also be defined that evaluate data items associated with one or more block chains for use by the interexchange application or by an analysis application.

In an embodiment, an interexchange application reads a data item from a first block chain associated with a first electronic device, creates a new block containing the data item, and attaches that new block to a second block chain associated with a second electronic device. This operation performed by the interexchange application may depend upon knowing where to find the data item in the first block chain, for example in what field of a data portion of a block, and upon knowing where to place the data item in the new block for the second block chain, for example in what field of a data portion of the new block. In an embodiment, the interexchange application may locate the data item in the first block chain by executing a parsing subroutine provided by an OEM of the first electronic device. The parsing subroutine may execute based on the block schema. If the data item is encrypted on the first block chain, the parsing subroutine provided by the OEM may further provide a mechanism for decrypting the data item, for example a method to execute to obtain a key from a trusted repository maintained by the OEM. The OEM of the second electronic device may provide a subroutine for building the new block and for placing the data item in the appropriate location within a data portion of the new block. The interexchange application may also execute transcoding subroutines to convert the data item from a first representation associated with the first electronic device to the interexchange representation and to convert the interexchange representation to a second representation associated with the second electronic device.

In an embodiment, the interexchange application reads a first data item from a first block chain associated with a first electronic device, reads a second data item from a second block chain associated with a second electronic device, creates a third data item based on the first data item and the second data item, and stores the third data item in a third block chain, separate from the first block chain and the second block chain. This processing may involve transcoding the first data item and the second data item to the interexchange representation, creating a third data item in the interexchange representation based on the interexchange representation of the first data item and the interexchange representation of the second data item, transcoding the interexchange representation of the third data item to a third representation appropriate for the third block chain, storing the third representation of the third data item in a new block, and adding this new block to the third block chain.

In some cases, this processing may further involve locating keys to decrypt the first data item or the second data item or to encrypt the third data item. In an embodiment, the interexchange application looks up a state evaluation rule in a data store, executing the state evaluation rule while providing the transcoded first data item and transcoded second data item to the state evaluation rule as input, where the result of the execution of the state evaluation rule comprises the third data item. In an embodiment, the interexchange application may establish a trusted end-to-end communication link to a trusted data store of keys for use in decrypting and/or encrypting data items. The interexchange application, when obtaining and using these keys, may execute in a trusted security zone of a processor, for example a processor of a computer system.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Figure 1:
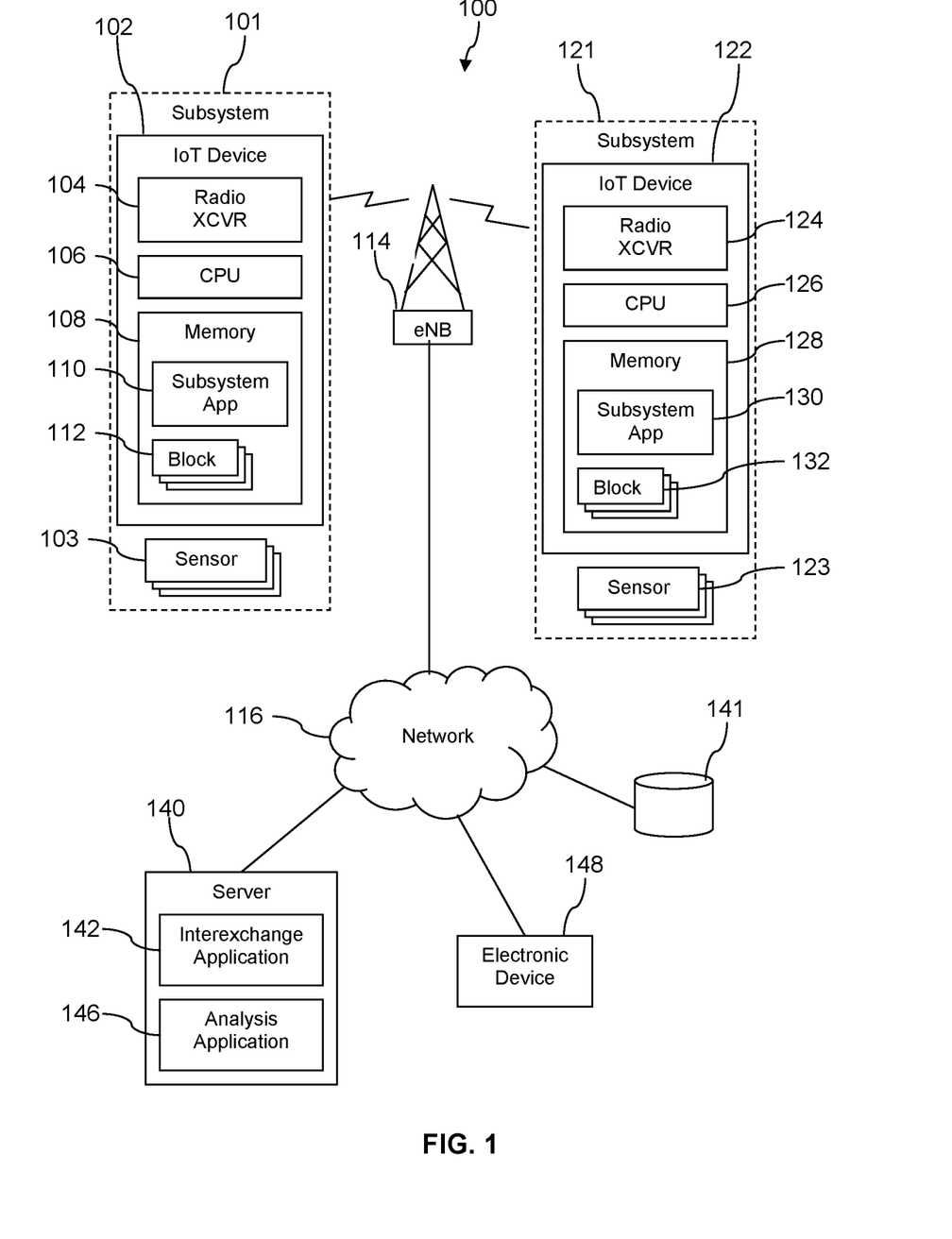
FIG. 1 is block diagram of a system according to an embodiment of the disclosure.

Turning now to FIG. 1, a system 100 is described. In an embodiment, system 100 comprises a first internet of things (IoT) device 102 comprising a radio transceiver 104, a processor 106, and a memory 108 that comprises a first subsystem application 110 and a first block chain 112. The first IoT device 102 communicates wirelessly via the radio transceiver 104 with a cell site 114 and through the cell site 114 with a network 116. The first IoT device 102 is associated with a first subsystem 101. The system 100 further comprises a second IoT device 122 that comprises a radio transceiver 124, a processor 126, and a memory 128 that comprises a second subsystem application 130 and a second block chain 132. The second IoT device 122 communicates wirelessly via the radio transceiver 124 with the cell site 114 and through the cell site 114 with the network 116. The second IoT device 122 is associated with a second subsystem 121.

The radio transceivers 104, 124 may establish wireless communication links with the cell site 114 according to a long term evolution (LTE), a code division multiple access (CDMA), a global system for mobile communication (GSM), or a worldwide interoperability for microwave access (WiMAX) telecommunication protocol. In a different embodiment, the radio transceivers 104, 124 may be communicatively linked to the network 116 via a different wireless device such as a WiFi access point (AP) using a WiFi wireless communication protocol or via a Bluetooth® station using a Bluetooth® wireless communication protocol. The network 116 comprises one or more private networks, one or more public networks, or a combination thereof.

While two subsystems 101, 121 and two IoT devices 102, 122 are depicted in FIG. 1, the system 100 may comprise any number subsystems and any number of IoT devices. The system 100 further comprises a server 140 that executes an interexchange application 142 and a data store 141. In an embodiment, the server 140 may further execute an analysis application 146. The server 140 and the data store 141 are communicatively coupled to the network 116. The server 140 can be implemented as a computer system. Computer systems are described further hereinafter. In an embodiment, the first block chain 112 is stored in the data store 141. In an embodiment, the second block chain 132 is stored in the data store 141.

The interexchange application 142 is configured to provide a variety of functionality to promote intercommunication between the IoT devices 102, 122 and/or between the IoT devices 102, 122 and an electronic device 148. For example, the interexchange application 142 may access one or more blocks of the first block chain 112, one or more blocks of the second block chain 132, transcode a first data item in a first form or in a first representation from the first block chain 112 to an interexchange representation, and transcode a second data item in a second form or in a second representation from the second block chain 132 to the interexchange representation, and take some action based on the two transcoded data items. For example, the interexchange application 142 may invoke the analysis application 146, passing the two transcoded data items to the analysis application 146 as input. The analysis application 146 may then take some action based on its analysis, for example providing control commands to the electronic device 148. The general arrangements of the system 100 are contemplated by the inventors to apply to many alternative configurations.

The first block chain 112 comprises a plurality of blocks that are serially related to each other. For example, a first block of the first block chain 112 was created and added to the first block chain 112 before a second block of the first block chain 112 was created and added to the first block chain 112; the second block of the first block chain 112 was created and added to the first block chain 112 before a third block of the first block chain 112 was created and added to the first block chain 112; and so on. Each block of the first block chain 112 comprises data related to the first IoT device 102 and/or to an environment in which the first IoT device 102 operates. The subsystem 101 to which the IoT device 102 is associated may be an internal combustion engine subsystem, a transmission subsystem, or other subsystem. The IoT device 102 may receive inputs from one or more sensors 103 associated with the first subsystem 101, for example a temperature sensor, a fuel flow sensor, an air intake pressure sensor, an angular velocity sensor (e.g., RPM), and other sensors. The data stored in a block of the first block chain 112 may comprise a plurality of different data items captured at about the same time. For example, inputs may be captured once per minute, the inputs stored as data items in a new block and the new block added to the first block chain 112. In another example, the inputs may be captured at a different periodic rate, while the subsystem 101 is in operation.

In an embodiment, the first subsystem application 110 receives the inputs from the subsystem 101 (e.g., from the sensors 103), stores the value of these inputs in data items, creates a new block comprising the data items, and adds the new block to the first block chain 112. In an embodiment, the first subsystem application 110 may encrypt the value stored in the data items using an encryption key associated with the first IoT device 102. The value of the inputs may be stored in a form or representation that is distinctive to the first IoT device 102 and/or to the first subsystem application 110. This representation may be representing the value in a particular system of units, such as an English system of units or in the SI system of units. This representation may be representing the value according to a particular digital encoding scheme. This representation may represent a raw value of a sensor input, for example before the raw value has been converted to a unit in any system. For example, the output of a temperature sensor may vary between 0 millivolts and 25.0 millivolts, and these values may correspond to a temperature of −50 degrees Fahrenheit to 450 degrees Fahrenheit. In one representation, the raw value in millivolts may be stored in the data item. In another representation, the raw value may be converted by the first subsystem application 110 to a conventional temperature unit such as degrees Fahrenheit, degrees Celsius, or degrees Kelvin. In an embodiment, the first subsystem application 110 may represent the input data in forms or representations different from the examples given above.

The descriptions of the first IoT device 102, the first subsystem application 110, and the first block chain 112 may likewise apply generally to the second IoT device 122, the second subsystem application 130, and the second block chain 132. The second subsystem 121 may comprise a plurality of sensors 123. In an embodiment, the form or representation of data items stored in blocks in the first block chain 112 are different from the form or representation of data items stored in blocks in the second block chain 132. In some contexts, the forms of the block chains 112, 132 may be called disparate forms or disparate representations. In an embodiment, a first key used by the first subsystem application 110 to encrypt values stored in the first block chain 112 is different from a second key used by the second subsystem application 130 to encrypt values stored in the second block chain 132.

The interexchange application 142 may transcode data items in a first representation format from the first block chain 112 to an interexchange representation format and may transcode data items in a second representation format from the second block chain 132 to the interexchange representation format. By transcoding the data items from two different or disparate representation formats to the interexchange representation format, the data items may more advantageously be used in concert by the analysis application 146, by the electronic device 148, and/or by another data consumer. The data items transcoded into the interexchange representation format may be more advantageously stored together in a data store. The interexchange application 142 may look-up transcoding rules or scripts from the data store 144. The transcoding rules may include rules for transcoding from a proprietary representation format to the interexchange format and rules for transcoding from the interexchange format to a proprietary representation. The interexchange application 142 may further look-up block schemas in the data store that it may use to located desired data items within the blocks of the block chains, for example a first block schema associated with the first block chain 112 and a second block schema associated with the second block chain 132.

In an embodiment, the electronic device 148 may be a head unit or telematics unit in a motor vehicle. The electronic device 148 may compare an engine temperature provided by the first IoT device 102 with a transmission temperature provided by the second IoT device 122 to corroborate the temperature values with each other, for example to conduct a "sanity check" on the values provided by the IoT devices 102, 122. If the engine temperature indicates −50 degrees Fahrenheit while the transmission indicates 140 degrees Fahrenheit, the electronic device 148 could reasonably suspect the engine temperature value is faulty. In addition to sanity checks, the comparison of various operating parameter values provided by the IoT devices 102, 122 can be applied to other determinations. It is understood that the transcoding of data items stored by the block chains 112, 132 by the interexchange application 142 is desirable before feeding the data items in the interexchange format to the electronic device 148. The interexchange format can be any desired format, for example a format desired by or stipulated by the electronic device 148.

Figure 2:
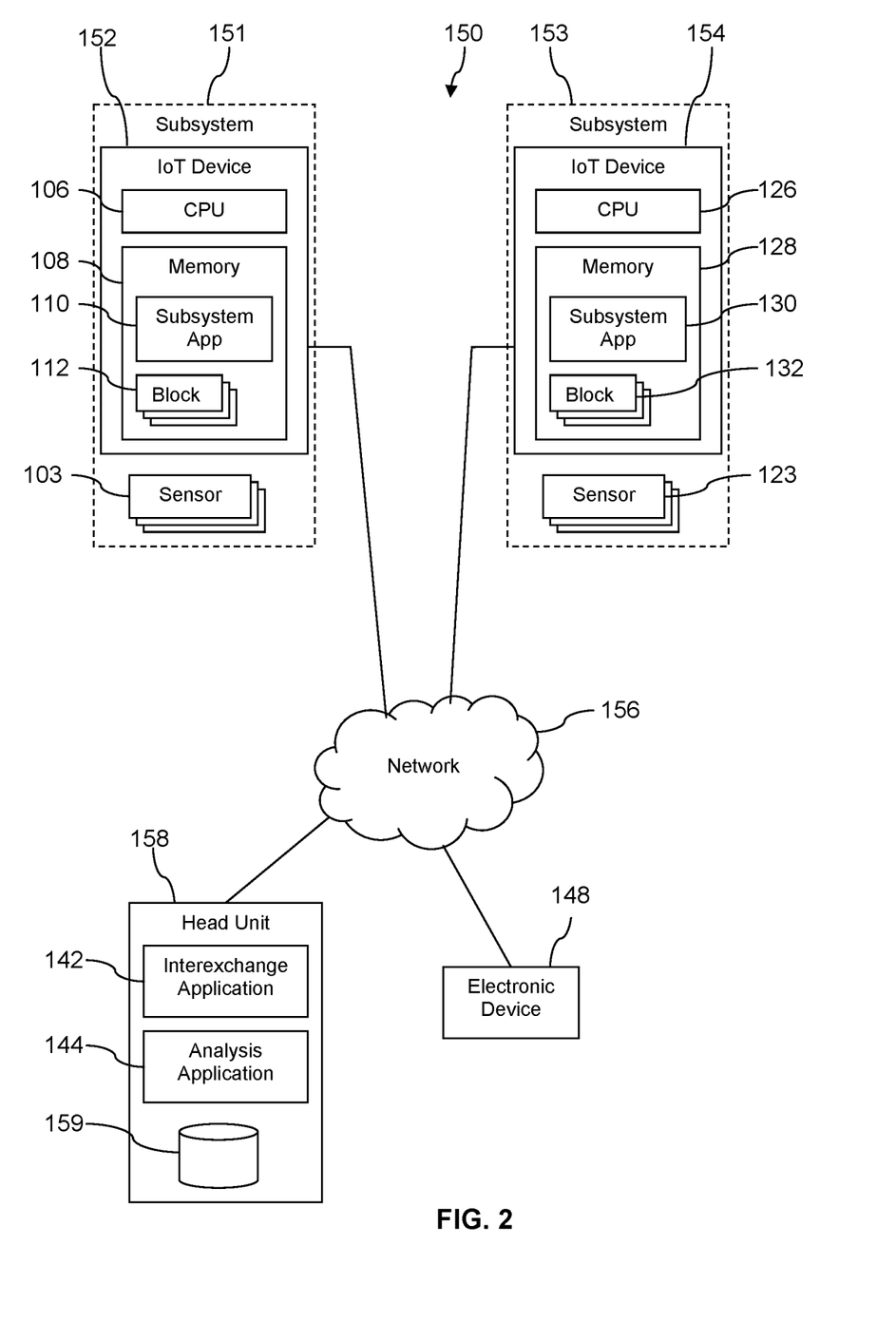
FIG. 2 is a block diagram of another system according to an embodiment of the disclosure.

Turning now to FIG. 2, a system 150 is described. In an embodiment, the system 150 is substantially similar to the system 100, with some exceptions. The system 150 comprises a third subsystem 151 associated to a third IoT device 152 and a fourth subsystem 153 associated to a fourth IoT device 154. The third IoT device 152 is connected to a network 156 by a wired connection. The fourth IoT device 154 is connected to the network 156 by a wired connection. The system 150 further comprises a head unit 158 that executes the interexchange application 142 and the analysis application 144. The head unit 158 may be implemented as a computer system, for example a computer system that connects to one or more communication networks or communication buses within the system 150. The system 150 may be a motor vehicle. The network 156 may be a network located inside the motor vehicle. The head unit 158 may also be referred to as a telematics unit. The head unit 158 comprises a data store 159 that fills the roles played by the data store 141 in system 100. The electronic device 148 in system 150 may be a vehicle control system that generates control commands based on data provided by the third IoT device 152 and the fourth IoT device 154 via the interexchange application 142 that may transcode the data. The main difference between the system 100 described above and the system 150 of FIG. 2 is that the IoT devices 152, 154 are connected to the network 156 by wires rather than wirelessly. In this case, the IoT device 152, 154 may not comprise radio transceivers.

In an embodiment, the interexchange application 142 may take data items from the first block chain 112, transcode them to the interexchange format, transcode them from the interexchange format to the format associated with the second block chain 132, add the data from the first block chain 112 transcoded into the format of the second block chain 132 to a new block, and add the new block to the second block chain 132. In an embodiment, the interexchange application 142 passes the data transcoded into the format of the second block chain to the second subsystem application 130, and the second subsystem application 130 creates the new block containing the transcoded data and adds it to the second block chain 132. In an embodiment, the block chains 112, 132 may be stored in the data store 159.

With reference now to both FIG. 1 and FIG. 2, part of the challenge of sharing or making available data items from block chains 112, 132 of IoT devices 102, 122 is that the location of the data items in a data portion of a block may be specific to the subject block chain 112, 132. Said in other words, each OEM making an IoT device may choose their own structure of arranging data items in a block. This means that to parse the data of a block and select a specific data item, the interexchange application 142 desirably learns the layout of the data items in the data portion of the blocks. The layout of data items in the data portion of blocks on block chains may be defined by a block schema associated with each block chain 112, 132 and the block schemes may be stored in the data store 144, 159.

Another challenge of sharing or making available data items from block chains 112, 132 is that the data items optionally may be encrypted. In an embodiment, the interexchange application 142 accesses the data store 141 to obtain keys for decrypting data for each block chain 112, 132, comprising encrypted data. To avoid the transmission of these keys being hacked as the key passes over the network 116 from the data store 141 to the server 140 that executes the interexchange application 142, the server 140 may establish a trusted end-to-end communication link with the data store 141 as described in U.S. Pat. No. 9,282,898, filed Jun. 25, 2012, entitled "End-to-end Trusted Communications Infrastructure," by Leo Michael McRoberts, et al., which was incorporated by reference above. In summary, this involves communication systems in the network 116 that establish the communication link between the server 140 and the data store 141, as well as the server 140 and the data store 141, executing the communication instructions while their processor executes in a trusted security zone.

In an embodiment, the interexchange application 142 may create a data block containing transcoded data from a data item of the first block chain 112 and containing transcoded data from a data item of the second block chain 132 and add the data block to a third block chain that is different from both the first block chain 112 and the second block chain 132. In an embodiment, the interexchange application 142 looks up or locates a state evaluation rule in the data store 141 based on an identity of the first subsystem 101 and based on an identity of the second subsystem 121. The interexchange application 142 executes the state evaluation rule, providing the transcoded data from the first block chain 112 and the transcoded data from the second block chain 132 as input to the state evaluation rule. Alternatively the analysis application 146 looks up the state evaluation rule, provides the transcoded data to the state evaluation rule, and executes the state evaluation rule.

Figure 3A:
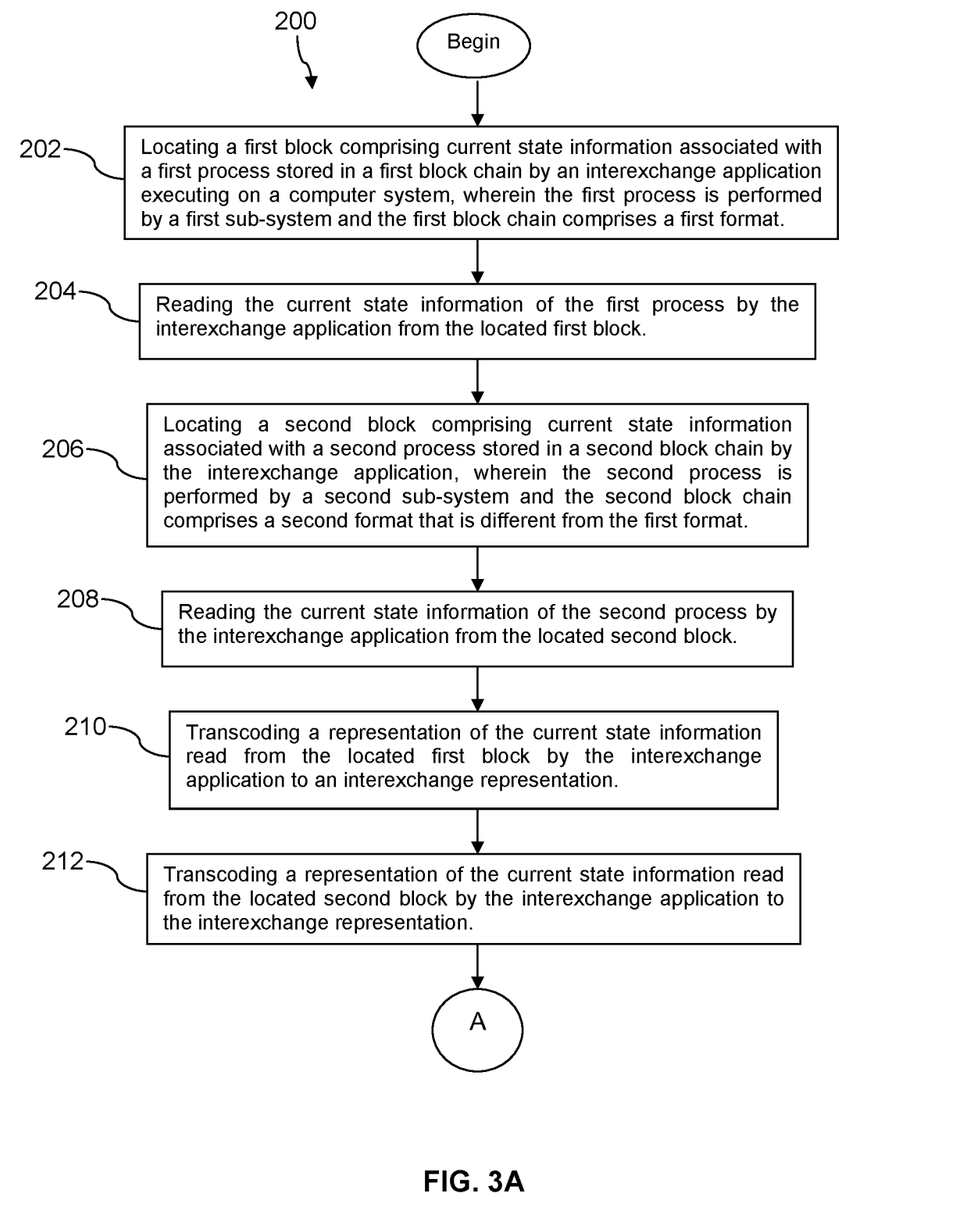
FIG. 3A and FIG. 3B are a flow chart of a method according to an embodiment of the disclosure.
Figure 3B:
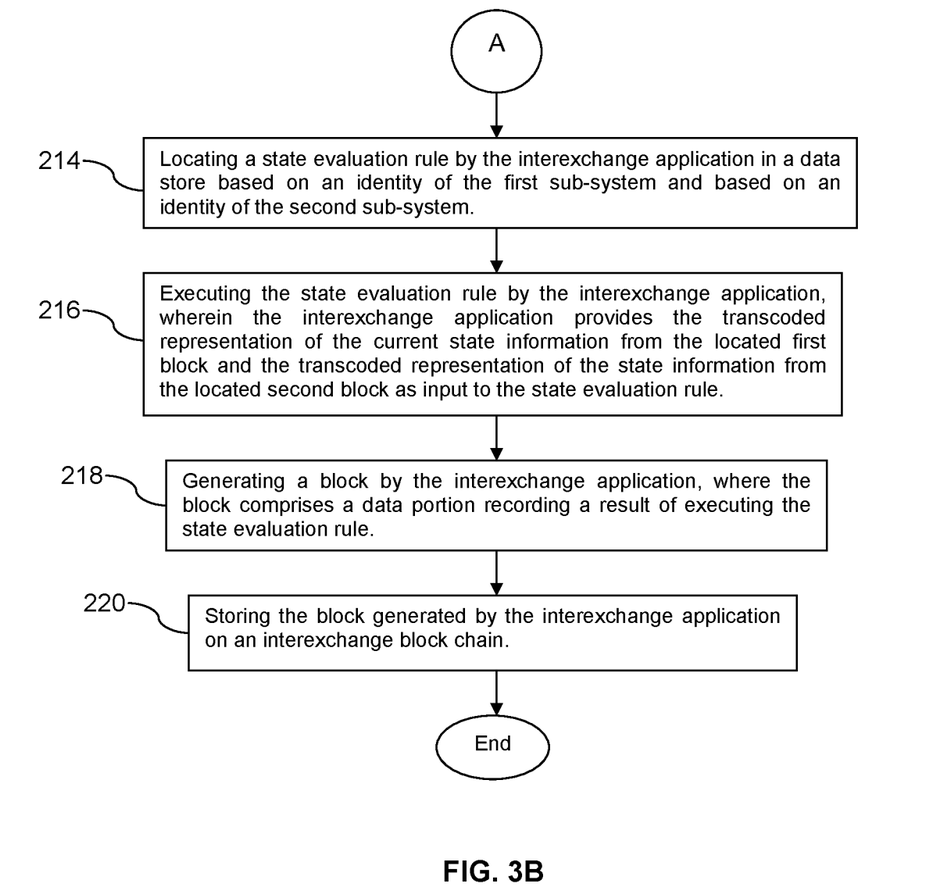

Turning now to FIG. 3A and FIG. 3B, a method 200 is described. In an embodiment, the method 200 is a method of using an interexchange to process states of subsystems tracked by disparate block chains. In an example, the interexchange application 142 described above with reference to FIG. 1 and FIG. 2 may perform the actions ascribed to the interexchange application in the processing blocks of method 200 described below.

At block 202, the method 200 comprises locating a first block comprising current state information associated with a first process stored in a first block chain by an interexchange application executing on a computer system, wherein the first process is performed by a first subsystem and the first block chain comprises a first format. At block 204, the method 200 comprises reading the current state information of the first process by the interexchange application from the located first block. The processing of block 204 may comprise looking up a first block schema associated with the first block chain by the interexchange application in a data store and reading the desired state information at least in part based on the first block schema. This may also be referred to as selecting the desired state information in the located first block, for example by reading the desired state information and not reading other state information located in the same first block.

At block 206, the method 200 comprises locating a second block comprising current state information associated with a second process stored in a second block chain by the interexchange application, wherein the second process is performed by a second subsystem and the second block chain comprises a second format that is different from the first format. At block 208, the method 200 comprises reading the current state information of the second process by the interexchange application from the located second block. The processing of block 208 may comprise looking up a second block schema associated with the second block chain by the interexchange application in a data store and reading the desired state information at least in part based on the second block schema. This may also be referred to as selecting the desired state information in the located second block, for example by reading the desired state information and not reading other state information located in the same second block.

At block 210, the method 200 comprises transcoding a representation of the current state information read from the located first block by the interexchange application to an interexchange representation. At block 212, the method 200 comprises transcoding a representation of the current state information read from the located second block by the interexchange application to the interexchange representation.

At block 214, the method 200 comprises locating a state evaluation rule by the interexchange application in a data store based on an identity of the first subsystem and based on an identity of the second subsystem. At block 216, the method 200 comprises executing the state evaluation rule by the interexchange application, wherein the interexchange application provides the transcoded representation of the current state information from the located first block and the transcoded representation of the state information from the located second block as input to the state evaluation rule. In another embodiment, the processing of block 214 and block 216 may be performed by the analysis application 146 described above with reference to FIG. 1 and FIG. 2.

At block 218, the method 200 comprises generating a block by the interexchange application, where the block comprises a data portion recording a result of executing the state evaluation rule. At block 220, the method 200 comprises storing the block generated by the interexchange application on an interexchange block chain.

The method 200 may further comprise reading the block from the interexchange block chain; based on the block read from the interexchange block chain, generating a control command; and sending the control command to a third subsystem, whereby the third subsystem is controlled. In an embodiment, the computer system of method 200 is a head unit or a telematics unit in a motor vehicle. The motor vehicle may be an automobile, a pickup truck, a semi-tractor trailer, a commercial truck, a boat, or an aircraft. The motor vehicle comprises a prime mover, such as an internal combustion engine or an electric motor or both. The first subsystem of method 200 may be a prime mover. The second subsystem of method 200 may be a transmission that mechanically couples power output by the prime mover to a drive system, such as to a drive shaft coupled to drive wheels or such as a caterpillar tread system. The first and second subsystem may be communicatively linked to the computer system by wired communication links or, at least in part, by wireless communication links (e.g., partially through radio communication links).

Figure 4:
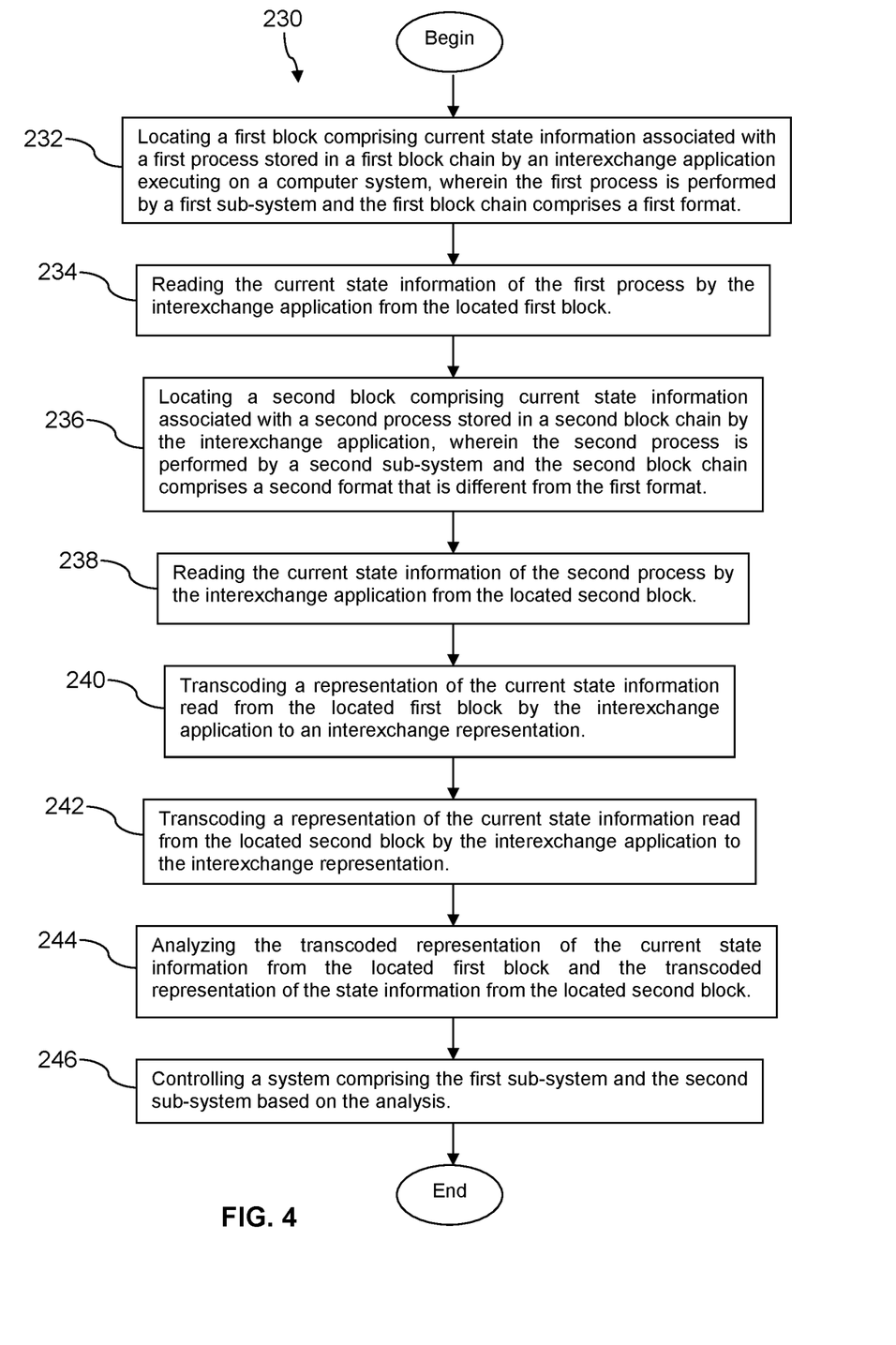
FIG. 4 is a flow chart of another method according to an embodiment of the disclosure.

Turning now to FIG. 4, a method 230 is described. In an embodiment, the method 230 is a method of using an interexchange (e.g., the interexchange application 142 described above with reference to FIG. 1 and FIG. 2) to process states of subsystems tracked by disparate block chains. At block 232, the method 230 comprises locating a first block comprising current state information associated with a first process stored in a first block chain by an interexchange application executing on a computer system, wherein the first process is performed by a first subsystem and the first block chain comprises a first format. At block 234, the method 230 comprises reading the current state information of the first process by the interexchange application from the located first block.

At block 236, the method 230 comprises locating a second block comprising current state information associated with a second process stored in a second block chain by the interexchange application, wherein the second process is performed by a second subsystem and the second block chain comprises a second format that is different from the first format. At block 238, the method 230 comprises reading the current state information of the second process by the interexchange application from the located second block.

At block 240, the method 230 comprises transcoding a representation of the current state information read from the located first block by the interexchange application to an interexchange representation. At block 242, the method 230 comprises transcoding a representation of the current state information read from the located second block by the interexchange application to the interexchange representation.

At block 244, the method 230 comprises analyzing the transcoded representation of the current state information from the located first block and the transcoded representation of the state information from the located second block. In an embodiment, the processing of block 244 may be performed by an analysis application executing on the computer system, for example, the analysis application 146 described above with reference to FIG. 1 and FIG. 2. At block 246, the method 230 comprises controlling a system comprising the first subsystem and the second subsystem based on the analysis. In an embodiment, the processing of block 246 may be performed by the analysis application or by another electronic device, for example the electronic device 148 described above with reference to FIG. 1 and FIG. 2.

In an embodiment, the system comprising the first subsystem and the second subsystem is a motor vehicle, such as an automobile, a pickup truck, a commercial truck, a semi-tractor trailer, or a boat. In an embodiment, the first subsystem is an internal combustion engine or other prime mover and the second subsystem is a transmission. In an embodiment, the first subsystem and the second subsystem are part of an industrial process system, such as a food production process system or an oil refinery. The blocks on the block chains may be created or built by IoT devices, for example blocks on the first block chain may be built by a first IoT device and blocks on the second block chain may be built by a second IoT device. These first and second block chains may be stored in a data store that is separate from the first IoT device and the second IoT device.

Figure 5:
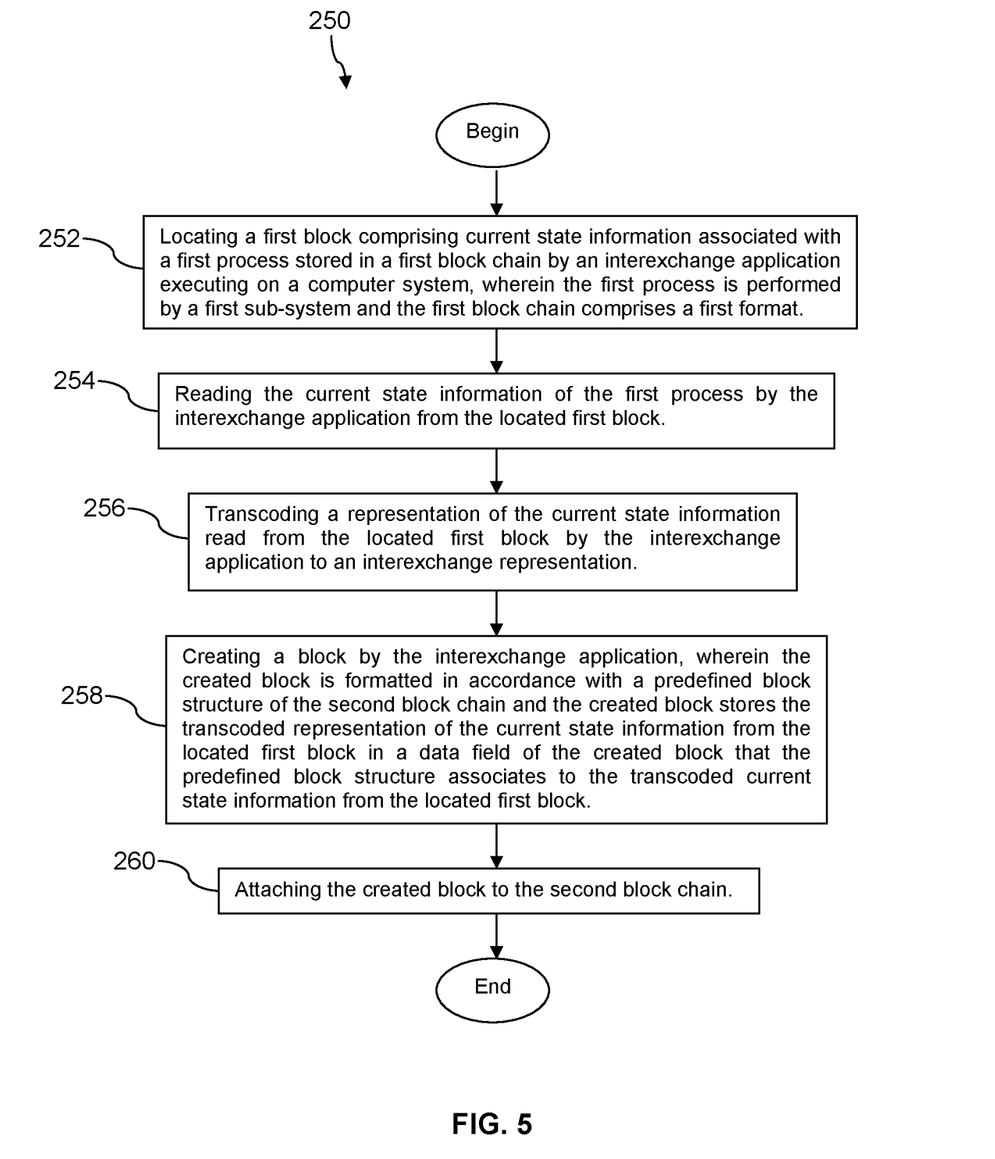
FIG. 5 is a flow chart of yet another method according to an embodiment of the disclosure.

Turning now to FIG. 5, a method 250 is described. In an embodiment, the method 250 is a method of using an interexchange (e.g., the interexchange application 142 described above with reference to FIG. 1 and FIG. 2) to process states of subsystems tracked by disparate block chains. At block 252, the method 250 comprises locating a first block comprising current state information associated with a first process stored in a first block chain by an interexchange application executing on a computer system, wherein the first process is performed by a first subsystem and the first block chain comprises a first format. At block 254, the method 250 comprises reading the current state information of the first process by the interexchange application from the located first block. At block 256, the method 250 comprises transcoding a representation of the current state information read from the located first block by the interexchange application to a representation associated with a second block chain.

At block 258, the method 250 comprises creating a block by the interexchange application, wherein the created block is formatted in accordance with a predefined block structure of the second block chain and the created block stores the transcoded representation of the current state information from the located first block in a data field of the created block that the predefined block structure associates to the transcoded current state information from the located first block. At block 260, the method 250 comprises attaching the created block to the second block chain.

In an embodiment, the second block chain is associated with a second subsystem and wherein the second subsystem controls a second process based at least in part on the transcoded representation of the current state information stored in the data field of the created block in the second block chain. In an embodiment, reading the current state information from the located first block comprises selecting one of a plurality of data items from the located first block by the interexchange application based on a block schema associated to the first block chain. The predefined structure of the second block chain may be defined by a block schema associated to the second block chain.

Figure 6:
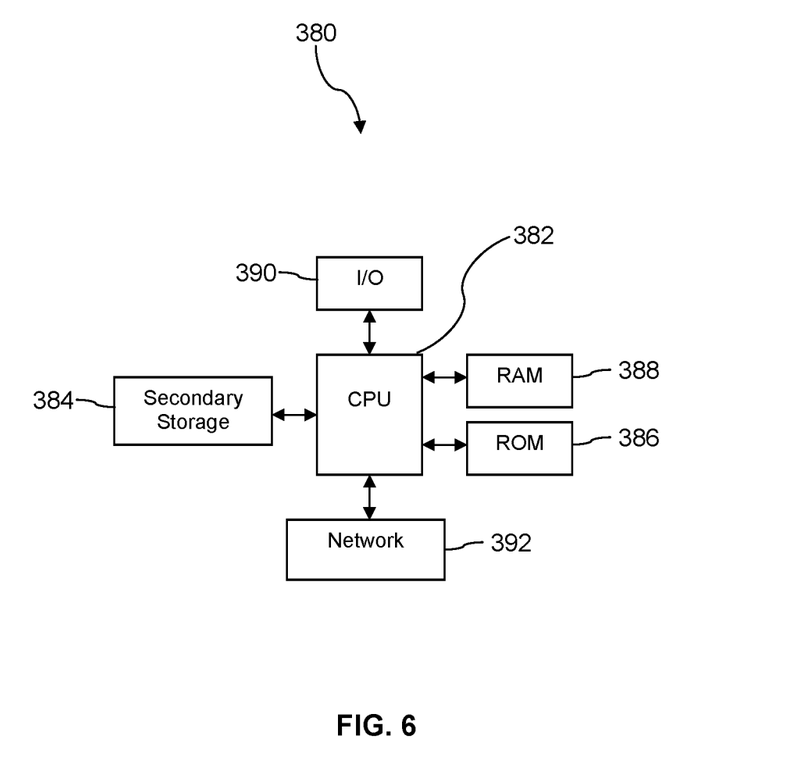
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of using an interexchange to process states of subsystems tracked by disparate block chains, comprising:

locating a first block comprising current state information associated with a first process stored in a first block chain by an interexchange application executing on a computer system, wherein the first process is performed by a first subsystem and the first block chain comprises a first format;

reading the current state information of the first process by the interexchange application from the located first block;

locating a second block comprising current state information associated with a second process stored in a second block chain by the interexchange application, wherein the second process is performed by a second subsystem and the second block chain comprises a second format that is different from the first format;

reading the current state information of the second process by the interexchange application from the located second block;

transcoding a representation of the current state information read from the located first block by the interexchange application to an interexchange representation;

transcoding a representation of the current state information read from the located second block by the interexchange application to the interexchange representation;

locating a state evaluation rule in a data store by the interexchange application based on an identity of the first subsystem and based on an identity of the second subsystem;

executing the state evaluation rule by the interexchange application, wherein the interexchange application provides the transcoded representation of the current state information from the located first block and the transcoded representation of the state information from the located second block as input to the state evaluation rule;

generating a block by the interexchange application, where the block comprises a data portion recording a result of executing the state evaluation rule; and storing the block generated by the interexchange application on an interexchange block chain.

2. The method of claim 1, further comprising:
reading the block from the interexchange block chain;
based on the block read from the interexchange block chain, generating a control command; and
sending the control command to a third subsystem, whereby the third subsystem is controlled.

3. The method of claim 1, wherein the computer system is a head unit in a motor vehicle, the first subsystem is a prime mover of the motor vehicle, and the second subsystem is a transmission of the motor vehicle.

4. The method of claim 1, wherein the first subsystem and the second subsystem are communicatively linked to the computer system by wired communication links.

5. The method of claim 1, wherein the first subsystem and the second subsystem are communicatively linked to the computer system at least in part by wireless communication links.

6. The method of claim 1, wherein transcoding the representation of the current state information read from the located first block comprises converting a representation of an electrical value produced by a sensor coupled to the first subsystem to a standardized unit.

7. The method of claim 6, wherein the standardized unit is selected from the group consisting of an English unit of measure and an International System of Units (SI) unit of measure.

* * * * *